United States Patent
Wan (10) Patent No.: US 11,387,686 B2
(45) Date of Patent: Jul. 12, 2022

(54) DEVICE TO BE CHARGED, WIRELESS CHARGING METHOD AND SYSTEM

(71) Applicant: GUANGDONG OPPO MOBILE TELECOMMUNICATIONS CORP., LTD., Guangdong (CN)

(72) Inventor: Shiming Wan, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 164 days.

(21) Appl. No.: 16/737,700

(22) Filed: Jan. 8, 2020

(65) Prior Publication Data

US 2020/0144871 A1    May 7, 2020

Related U.S. Application Data

(63) Continuation of application No. PCT/CN2018/086915, filed on May 15, 2018.

(51) Int. Cl.
*H02J 7/00*    (2006.01)
*H02J 50/80*   (2016.01)

(52) U.S. Cl.
CPC .......... *H02J 50/80* (2016.02); *H02J 7/00712* (2020.01)

(58) Field of Classification Search
USPC ................................. 320/106–115
See application file for complete search history.

(56) References Cited

U.S. PATENT DOCUMENTS

2008/0303479 A1    12/2008   Park et al.
2016/0036243 A1    2/2016    Hayashi et al.
(Continued)

FOREIGN PATENT DOCUMENTS

CN    104170209 A    11/2014
CN    105245025 A    1/2016
(Continued)

OTHER PUBLICATIONS

Office Action for IN application 202017003571 dated Aug. 31, 2020.
(Continued)

*Primary Examiner* — Binh C Tat
(74) *Attorney, Agent, or Firm* — Young Basile Hanlon & MacFarlane, P.C.

(57) ABSTRACT

The present disclosure discloses a device to be charged, and a wireless charging method and system. The device to be charged includes: a battery; a wireless receiving circuit, configured to receive an electromagnetic signal transmitted by a wireless charging device, and to convert the electromagnetic signal into an output voltage and an output current of the wireless charging circuit; a step-down circuit, coupled between the wireless receiving circuit and the battery, and configured to receive the output voltage of the wireless receiving circuit and to perform step-down processing on the output voltage; a detection circuit, configured to detect a voltage and/or a current entering the battery; and a control circuit, configured to communicate with the wireless charging device according to the voltage and/or the current detected by the detection circuit, so as to enable the wireless charging device to adjust a transmitting power of the electromagnetic signal.

18 Claims, 4 Drawing Sheets

(56) References Cited

U.S. PATENT DOCUMENTS

| | | | | |
|---|---|---|---|---|
| 2016/0336808 A1* | 11/2016 | Liu | ............. | H02J 50/12 |
| 2017/0063140 A1* | 3/2017 | Lee | ............. | H02J 7/025 |
| 2017/0117750 A1* | 4/2017 | Tsukamoto | ............. | H02J 50/80 |

FOREIGN PATENT DOCUMENTS

| | | |
|---|---|---|
| CN | 107959358 A | 4/2018 |
| CN | 207251274 U | 4/2018 |
| EP | 2328223 A1 | 6/2011 |
| EP | 2328223 B1 | 1/2013 |
| JP | 2009504116 A | 1/2009 |
| JP | 2009106136 A | 5/2009 |
| JP | 2013230007 A | 11/2013 |
| JP | 2016036225 A | 3/2016 |
| JP | 2017022953 A | 1/2017 |

OTHER PUBLICATIONS

Extended European Search Report for EP application 18918928.5 dated Sep. 10, 2020.
International Search Report with English Translation for PCT application PCT/CN2018/086915 filed Dec. 7, 2018.
Japan Office Action with English Translation for JP application 2020-509498 dated Mar. 10, 2021.
Communication pursuant to Article 94(3) EPC for EP Application 18918928.5 dated Jul. 26, 2021. (5 pages).
Japanese Decision to Grant a Patent with English Translation for JP Application 2020509498 dated Aug. 10, 2021 (5 pages).
Korean Office Action with English Translation for KR Application 1020207005815 dated Sep. 6, 2021. (8 pages).

* cited by examiner

DEVICE TO BE CHARGED, WIRELESS CHARGING METHOD AND SYSTEM

CROSS-REFERENCE TO RELATED APPLICATION(S)

This application is a continuation application of International Application No. PCT/CN2018/086915, filed on May 15, 2018, the entire contents of which are incorporated herein by reference.

TECHNICAL FIELD

The present disclosure relates to a field of charging technology, and more particularly, to a device to be charged, a wireless charging method and a wireless charging system.

BACKGROUND

With the popularization of wireless charging, more and more electronic devices support a function of wireless charging. The wireless charging technology includes the following wireless power transmission types: an electromagnetic induction type, an electromagnetic resonance type and an electromagnetic radiation type. Taking the electromagnetic-induction-type wireless charging technology as an example, the electromagnetic-induction-type wireless power transmission principle is that capability transmission is performed through coil coupling and a coil is arranged at a sending end and a receiving end respectively. The sending end is coupled to a high-frequency alternating signal so as to generate an electromagnetic signal. The receiving end converts the received electromagnetic signal into current through the coil, and the current is processed by circuits such as rectification, voltage stabilization and the like to provide electric energy for a device.

By adopting the wireless charging technology, an interface which is arranged on a device to be charged and configured to be coupled to a charging cable may be removed. Moreover, as there is no need to couple the cable in the charging process, the charging is more convenient.

However, in the related art, the wireless charging technology has at least a disadvantage of low charging efficiency during the wireless charging.

SUMMARY

In a first aspect, the present disclosure provides a device to be charged, including a battery; a wireless receiving circuit, configured to receive an electromagnetic signal transmitted by a wireless charging device and to convert the electromagnetic signal into an output voltage and an output current of the wireless receiving circuit; a step-down circuit, configured to receive the output voltage of the wireless receiving circuit and to perform step-down processing on the output voltage of the wireless receiving circuit, for charging the battery; a detection circuit, configured to detect a voltage and/or a current entering the battery; and a control circuit, configured to communicate with the wireless charging device according to the voltage and/or the current detected by the detection circuit, so as to enable the wireless charging device to adjust a transmitting power of the electromagnetic signal.

In a second aspect, a wireless charging method is provided. The method is applied to a device to be charged, and includes receiving an electromagnetic signal transmitted by a wireless charging device, and converting the electromagnetic signal into a first voltage and a first current; performing a step-down processing on the first voltage to obtain a voltage and/or a current for charging a battery of the device to be charged; detecting the voltage and/or the current entering the battery; and communicating with the wireless charging device according to the detected voltage and/or the detected current, so as to enable the wireless charging device to adjust a transmitting power of the electromagnetic signal.

In a third aspect, a wireless charging system is provided. The wireless charging system includes a wireless charging device and a device to be charged.

The device to be charged includes: a battery; a wireless receiving circuit, configured to receive an electromagnetic signal transmitted by the wireless charging device and to convert the electromagnetic signal into an output voltage and an output current of the wireless receiving circuit; a step-down circuit, configured to receive the output voltage of the wireless receiving circuit and to perform step-down processing on the output voltage of the wireless receiving circuit, for charging the battery; a detection circuit, configured to detect a voltage and/or a current outputted by the step-down circuit for charging the battery; and a second control circuit, configured to communicate with the wireless charging device according to the voltage and/or the current detected by the detection circuit.

The wireless charging device includes: a voltage conversion circuit, configured to receive an input voltage and to obtain an output voltage and an output current of the voltage conversion circuit by converting the input voltage; a wireless transmitting circuit, configured to transmit an electromagnetic signal according to the output voltage and the output current of the voltage conversion circuit; and a first control circuit, configured to perform wireless communication with the device to be charged during the wireless charging process, so as to obtain the voltage and/or the current outputted by the step-down circuit fed back by the device to be charged; and to adjust the output voltage and/or the output current of the voltage conversion circuit according to the voltage and/or the current outputted by the step-down circuit, so as to adjust a transmitting power of the electromagnetic signal.

Additional features and advantages of the present disclosure will be described in detail in the following detailed description.

BRIEF DESCRIPTION OF DRAWINGS

The accompanying drawings, which are included to provide a further understanding of and constitute a part of the present disclosure, explain the present disclosure with reference to the following detailed embodiments, rather than limit the present disclosure.

DETAILED DESCRIPTION

The present disclosure will be described in detail below with reference to the accompanying drawings. It should be understood that, the specific implementations described herein are only used to explain the present disclosure rather than to limit the present disclosure.

In the present disclosure, the term "circuit" refers to: (a) hardware-only circuit implementations (such as implementations in an analog-only and/or digital-only circuit); (b) combinations of a circuit and software (and/or firmware), such as (as applicable): (i) a combination of processor(s) or (ii) processor(s)/software (including digital signal processor(s)), software and a portion of memory (memories) that work together to enable a device such as a mobile telephone or a server to perform various functions; and (c) a circuit of, such as microprocessor(s) or a portion of microprocessor(s), that requires software or firmware for operation, even if the software or firmware does not physically exist. The above definition of "circuit" applies to all uses of this term in the present disclosure and is included in any claims.

In embodiments of the present disclosure, the device to be charged may refer to a terminal. The "terminal" may include, but is not limited to, a device configured to receive/transmit communication signals via wired connection (for example, public switched telephone network (PSTN), digital subscriber line (DSL), digital cable, direct cable connection and/or another data connection/network) and/or via a wireless interface (for example, cellular network, wireless local area network (WLAN), digital TV network such as digital video broadcasting handheld (DVB-H) network, satellite network, an amplitude modulation-frequency modulation (AM-FM) broadcasting transmitter, and/or a wireless interface of another communication terminal). The terminal configured to communicate via the wireless interface may be referred to as "wireless communication terminal", "wireless terminal" and/or "mobile terminal". Examples of the mobile terminal include, but are not limited to a satellite phone or a cell phone, a terminal combining a cell radio phone and a personal communication system (PCS) having capability of data process, fax, and data communication, a personal digital assistant (PDA) including a radio phone, a pager, an Internet/Intranet access, a web browser, a notepad & address book, a calendar and/or a global positioning system (GPS) receiver, and a common laptop and/or handheld receiver, or other electronic devices including a radio phone transceiver. In addition, the device to be charged or the terminal used in embodiments of the present disclosure may include a power bank, which may receive charging from the wireless charging device, so that energy may be stored, for providing energy to other electronic devices.

Figure 1:
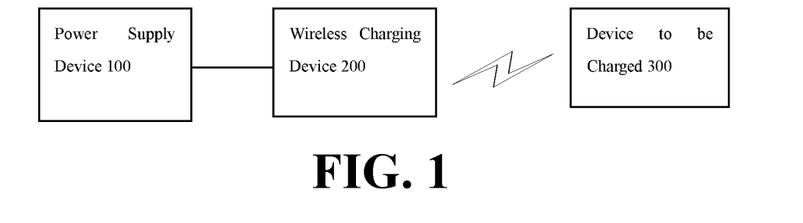
FIG. 1 is a schematic diagram of a wireless charging system according to an embodiment of the present disclosure.

FIG. 1 is a schematic diagram of a wireless charging system according to an embodiment of the present disclosure.

The wireless charging system 10 includes: a power supply device 100, a wireless charging device 200 and a device to be charged 300.

In an embodiment, the power supply device 100 is configured to supply a direct current to the wireless charging device 200. The power supply device 100 may include a rectifying circuit, a voltage transformation circuit, a control circuit, a charging interface and so on, so that an AC (alternating current) input may be converted into a DC (direct current) output, and the DC output may be provided to the wireless charging device 200. For example, the power supply device may be an adapter, a power bank, a vehicle power supply, or the like.

In an embodiment, the power supply device 100 may also directly supply an alternating current to the wireless charging device 200. For example, the power supply device 100 may be an AC power supply. When the power supply device 100 is an AC power supply, the wireless charging device 200 further includes a circuit or a module for converting AC current into DC current, for example, a rectifying and filtering circuit, a DC/DC conversion circuit 307, and the like.

The wireless charging device 200 is configured to convert the direct current or the alternating current provided by the power supply device 100 into an electromagnetic signal, so as to perform power transmission in a wireless manner.

Figure 2:
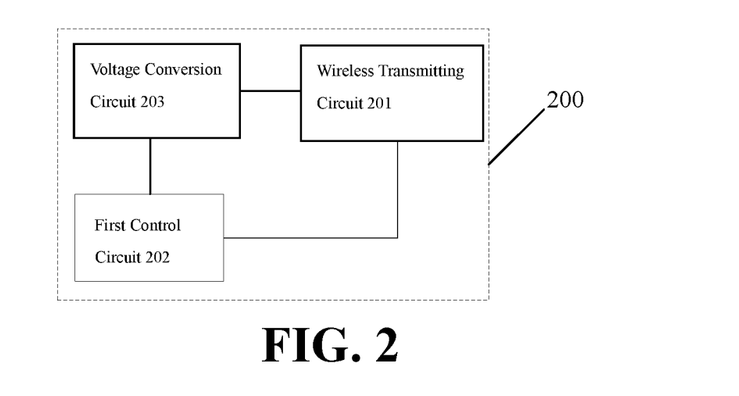
FIG. 2 is a block diagram of a wireless charging device according to an embodiment of the present disclosure.

Referring to FIG. 2, in an embodiment, the wireless charging device 200 includes the rectifying and filtering circuit (not shown), the DC/DC conversion circuit 307 (not shown), a wireless transmitting circuit 201 and a first control circuit 202.

The 220V alternating current is converted into stable direct current through the rectifying and filtering circuit, and then the voltage is regulated to a fixed value through the conversion of the DC/DC conversion circuit 307, for being supplied to the wireless transmitting circuit 201.

It should be understood that the rectifying and filtering circuit and the DC/DC conversion circuit 307 are optional. As described above, when the power supply device 100 is an AC power supply, the wireless charging device 200 may be provided with the rectifying and filtering circuit and the voltage conversion circuit 203. When the power supply device 100 may supply a stable direct current, the rectifying and filtering circuit and/or the voltage conversion circuit 203 may be eliminated.

The wireless transmitting circuit 201 is configured to convert the direct current supplied by the voltage conversion circuit 203 or the direct current supplied by the power supply device into an alternating current that may be coupled to a transmitting coil. Then, the alternating current is converted by the transmitting coil into an electromagnetic signal for transmission.

In an embodiment, the wireless transmitting circuit 201 may include an inverter circuit and a resonant circuit. The inverter circuit may include a plurality of switch tubes, and a magnitude of an output power may be adjusted by controlling the on-time (duty ratio) of the switch tubes. The resonant circuit is configured to transmit electrical energy. For example, the resonant circuit may include a capacitor and the transmitting coil. By adjusting the resonant frequency of the resonant circuit, the output power of the wireless transmitting circuit 201 may be adjusted.

In an embodiment, the wireless charging device 200 may be a wireless charging base or a device with an energy storage function. When the wireless charging device 200 is a device with the energy storage function, it further includes an energy storage module (e.g., a lithium battery 305) that may obtain and store electric energy from an external power supply device. Thus, the energy storage module may provide the electric energy to the wireless transmitting circuit 201. It should be understood that the wireless charging device 200 may obtain the electric energy from the external power supply device in a wired or wireless mode. In the wired mode, as an example, the wireless charging device 200 is coupled to the external power supply device through the charging interface (for example, a Type-C interface) to obtain electric energy. In the wireless mode, for example, the wireless charging device 200 includes a wireless receiving circuit 301 that may wirelessly obtain electric energy from a device having a wireless charging function.

The first control circuit 202 is configured to control the wireless charging process. For example, the first control circuit 202 may communicate with the power supply device to determine an output voltage and/or an output current of the power supply device. Alternatively, the first control circuit 202 may also communicate with the device to be charged, so as to realize interaction of charging information (e.g., voltage information of a battery 305 in the device to be charged, temperature information of the battery 305, charging mode information, etc.), determination of charging parameters (e.g., a charging voltage and/or a charging current) for wireless charging, and so on.

It should be understood that the wireless charging device 200 may also include other related hardware, logic devices, circuits and/or codes to perform corresponding functions. For example, the wireless charging device 200 may further include a display module (e.g., a light emitting diode or an LED display screen) for displaying a charging status (e.g., charging in progress or charging termination, etc.) in real time during the wireless charging process.

Referring to FIG. 2, in an embodiment of the present disclosure, the wireless charging device 200 further includes a voltage conversion circuit 203. The voltage conversion circuit 203 is configured to perform voltage conversion on a current supplied to the wireless transmitting circuit 201 when the voltage corresponding to the current supplied to the wireless transmitting circuit 201 does not satisfy a preset condition. As previously described, in an embodiment, the current provided to the wireless transmitting circuit 201 may be provided by the voltage conversion circuit 203, by the power supply device, by the aforementioned energy storage module, or the like.

Of course, alternatively, when the voltage supplied to the wireless transmitting circuit 201 may reach a voltage requirement on an input voltage required by the wireless transmitting circuit 201, the voltage conversion circuit 203 may be omitted, thereby simplifying the implementation of the wireless charging device. The voltage requirement on the input voltage required by the wireless transmitting circuit 201 may be set according to actual requirements, for example, may be set to 10V.

In an embodiment of the present disclosure, the voltage corresponding to the current supplied to the wireless transmitting circuit 201 failing to satisfy the preset condition means that the voltage is lower than or higher than the required voltage of the wireless transmitting circuit 201. For example, when the wireless charging is performed in a charging mode featuring a high voltage and a low current (e.g., 20V/1 A), this charging mode has a high requirement on an input voltage of the wireless transmitting circuit 201 (e.g., the voltage requirement is 10V or 20V). When the voltage supplied to the wireless transmitting circuit 201 cannot reach the voltage requirement of the wireless transmitting circuit 201, the voltage conversion circuit 203 may boost the input voltage to reach the voltage requirement of the wireless transmitting circuit 201. When the output voltage of the power supply device exceeds the voltage requirement of the wireless transmitting circuit 201, the voltage conversion circuit 203 may step down the input voltage to reach the voltage requirement of the wireless transmitting circuit 201.

Figure 3:
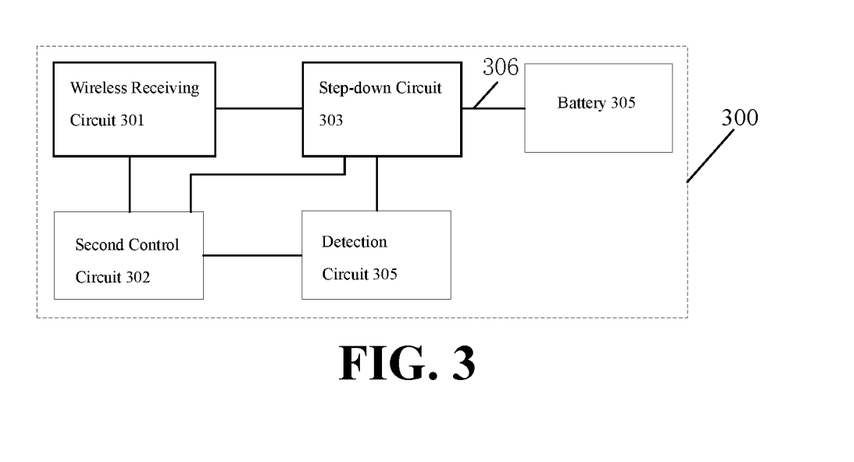
FIG. 3 is a block diagram of a device to be charged according to an embodiment of the present disclosure.

Referring to FIG. 3, in an embodiment of the present disclosure, the device to be charged 300 includes the wireless receiving circuit 301, a second control circuit 302, a step-down circuit 303, a detection circuit 304, the battery 305 and a first charging channel 306.

In an embodiment, the wireless receiving circuit 301 is configured to convert the electromagnetic signal transmitted by the wireless transmitting circuit 201 of the wireless charging device 200 into an alternating current through a receiving coil, and to perform rectification and/or filtering operations on the alternating current to convert the alternating current into a stable direct current, thereby charging the battery 305.

In an embodiment, the wireless receiving circuit 301 includes the receiving coil and the AC/DC conversion circuit 307. The AC/DC conversion circuit 307 is configured to convert the alternating current received by the receiving coil into the direct current.

In an embodiment of the present disclosure, the battery 305 may include a single cell or multiple cells. When the battery 305 includes multiple cells, the cells are coupled in series. Therefore, the charging voltage that the battery 305 may bear is a sum of charging voltages that the multiple cells may bear, so that the charging speed may be increased and the heat generated in charging may be reduced.

Taking the device to be charged being a mobile phone as an example, when the battery 305 in the device to be charged includes a single cell, the voltage of the single cell inside generally ranges from 3.0V to 4.35V. When the battery 305 in the device to be charged includes two cells coupled in series, a total voltage of the two cells coupled in series is from 6.0V to 8.7V. Therefore, compared with a single cell, the output voltage of the wireless receiving circuit 301 may be increased when multiple cells coupled in series are adopted. Compared with the single cell, to reach the same charging speed, a charging current required by the multiple cells is about 1/N of the charging current required by the single cell (N is the number of the cells which are coupled in series in the device to be charged). In other words, on the premise of ensuring the same charging speed (the same charging power), the solution of adopting multiple cells may reduce the magnitude of the charging current, such that the heat generated by the device to be charged in the charging process is reduced. On the other hand, compared with the solution of adopting the single cell, under the condition that the charging current is kept the same, the solution of adopting the multiple cells coupled in series may improve the charging voltage as well as the charging speed.

In an embodiment of the present disclosure, the first charging channel 306 may be a wire. The step-down circuit 303 may be disposed on the first charging channel 306.

The step-down circuit 303 is configured to perform step-down processing on the direct current output by the wireless receiving circuit 301, so as to obtain the output voltage and the output current of the first charging channel 306. In an embodiment, a voltage value and a current value of the direct current output by the first charging channel 306 meet charging requirements of the battery 305, and may be directly loaded to the battery 305.

The detection circuit 304 is configured to detect a voltage and/or a current of the first charging channel 306. The voltage and/or the current of the first charging channel 306 may refer to a voltage and/or a current between the wireless receiving circuit 301 and the step-down circuit 303, i.e., the output voltage and/or the output current of the wireless receiving circuit 301. Alternatively, the voltage and/or the current on the first charging channel 306 may also refer to a voltage and/or a current between the step-down circuit 303 and the battery 305, i.e., the output voltage and/or the output current of the step-down circuit 303. Alternatively, the voltage and/or the current on the first charging channel 306 may also refer to a voltage and/or a current entering the battery 305.

In an embodiment, the detection circuit 304 may include a voltage detection circuit 304 and a current detection circuit 304. The voltage detection circuit 304 may be configured to sample the voltage on the first charging channel 306 and to send the sampled voltage value to the second control circuit 302. In some embodiments, the voltage detection circuit 304 may sample the voltage on the first charging channel 306 by dividing the voltage through series connection. The current detection circuit 304 may be configured to sample the current on the first charging channel 306 and to send the sampled current value to the second control circuit 302. In some embodiments, the current detection circuit 304 may sample and detect the current on the first charging channel 306 through a current sensing resistor and a galvanometer.

In an embodiment, the second control circuit 302 is configured to communicate with the first control circuit 202 of the wireless charging device, and to feed back the voltage and/or the current detected by the detection circuit 304 to the first control circuit 202. Consequently, the first control circuit 202 may adjust a transmitting power of the wireless transmitting circuit 201 according to the fed-back voltage and/or current, so that the voltage and/or the current of the direct current output by the first charging channel 306 matches a charging voltage value and/or a charging current value required by the battery 305.

It should be understood that in an embodiment of the present disclosure, "matches a charging voltage value and/or a charging current value required by the battery 305" includes that: the voltage value and/or the current value of the direct current output by the first charging channel 306 is equal to the charging voltage value and/or the charging current value required by the battery 305 or fluctuates within a predetermined range (e.g., the voltage value fluctuates up and down 100 mv ~200 my around the charging voltage value and/or the charging current value required by the battery 305).

In embodiments of the present disclosure, there may be various implementation forms of the step-down circuit 303. As an example, the step-down circuit 303 may be a Buck circuit. As another example, the step-down circuit 303 may be a charge pump. The charge pump is composed of a plurality of switching devices. The heat generated by the current flowing through the switching devices is very small and almost equal to the heat generated by the current directly passing through the wire, so the charge pump is adopted as the step-down circuit 303, thereby reducing the voltage and generating lower heat.

In an embodiment of the present disclosure, a ratio of the output voltage to the input voltage of the charge pump may be ½, ⅓, ⅔ or ¼, and the specific ratio is related to actual operating parameters of the circuit.

In an embodiment, settings of a voltage boosting multiple of the voltage conversion circuit 203 in the wireless charging device 200 and a step-down multiple of the step-down circuit 303 in the device 300 to be charged are related to parameters such as an output voltage that may be provided by the power supply device and a charging voltage required by the battery 305. The two parameters may be equal or not, which are not specifically limited in embodiments of the present disclosure.

As an example, the voltage boosting multiple of the voltage conversion circuit 203 and the step-down multiple of the step-down circuit 303 may be set to be equal. For example, the voltage conversion circuit 203 may be a voltage doubling circuit for boosting the output voltage of the power supply device by 2 times; and the step-down circuit 303 may be a half-voltage circuit for reducing the output voltage of the wireless receiving circuit 301 by half.

In this embodiment, the ratio of the voltage boosting multiple of the voltage conversion circuit 203 to the step-down multiple of the step-down circuit 303 is set as 1:1. In such an arrangement, the output voltage and the output current of the step-down circuit 303 are respectively consistent with the output voltage and the output current of the power supply device, which is beneficial to simplifying the implementation of the control circuit. Take the charging current required by the battery 305 being 5 A as an example. When the second control circuit 302 obtains through the detection circuit 304 that the output current of the step-down circuit 303 is 4.5 A, the output power of the power supply device needs to be adjusted until the output current of the step-down circuit 303 reaches 5 A. When the ratio of the voltage boosting multiple of the voltage conversion circuit 203 to the step-down multiple of the step-down circuit 303 is not equal to 1:1, the first control circuit 202 or the second control circuit 302 needs to recalculate an adjustment value of the output power of the power supply device according to a difference between the present output current of the step-down circuit 303 and an expected value, when adjusting the output power of the power supply device. According to an embodiment of the present disclosure, the ratio of the voltage boosting multiple of the voltage conversion circuit 203 to the step-down multiple of the step-down circuit 303 is set as 1:1, so that the second control circuit 302 only needs to notify the first control circuit 202 to boost the output current to 5A, thereby simplifying a feedback adjustment manner of a wireless charging channel.

In an embodiment of the present disclosure, the device to be charged further includes a constant voltage and constant current circuit coupled between the wireless receiving circuit and the step-down circuit 303. The constant voltage and constant current circuit is configured to perform constant voltage and/or constant current control on an output of the wireless receiving circuit before outputting the output of the wireless receiving circuit to the step-down circuit 303. The step-down circuit 303 receives the output voltage of the constant voltage and constant current circuit, and steps down the output voltage for charging the battery.

In some embodiments, the device to be charged further includes a constant voltage and constant current control circuit. The constant voltage and constant current control circuit is configured to control constant voltage and/or constant current process of the constant voltage and constant current circuit according to the voltage and/or the current detected by the detection circuit. Alternatively, the constant voltage and constant current control circuit may be integrated with the second control circuit 302, i.e., the second control circuit 302 may have a function of the constant voltage and constant current control circuit. It should be understood that the constant voltage and constant current control circuit may also be implemented by a separate control chip.

In some embodiments, the constant voltage and constant current circuit is coupled between the step-down circuit 303 and the battery for charging the battery after performing the constant voltage and/or constant current control on the output of the step-down circuit 303. Therefore, in this case, the output of the constant voltage and constant current circuit may directly enter the battery, and the charging voltage and the charging current required by the battery are satisfied.

In some embodiments, the constant voltage and constant current circuit includes a Buck circuit and/or a low dropout linear regulator.

In embodiments of the present disclosure, the step-down function of the step-down circuit 303 is separated from the constant voltage and/or constant current control function of the constant voltage and constant current circuit to a certain extent, so that the configuration of the circuit is more flexible and the heat generated by the constant voltage and constant current circuit is reduced. On the other hand, since the step-down circuit 303 is matched with the constant voltage and constant current circuit, the charge pump may be selected as the step-down circuit 303. As the heat generation of the charge pump is low, the heat generated by the device to be charged in the wireless charging process may be reduced.

Alternatively, the step-down conversion efficiency of the step-down circuit 303 may be higher than that of the constant voltage and constant current circuit. The step-down conversion efficiency may be used to indicate energy loss during the step-down process. The fact that the step-down conversion efficiency of the step-down circuit 303 is higher than that of the constant voltage and constant current circuit may mean that the energy loss (or power loss) of the step-down circuit 303 is smaller than that of the constant voltage and constant current circuit under the same step-down condition. Assuming that the constant voltage and constant current circuit performs step-down with a BUCK circuit, the step-down conversion efficiency of the step-down circuit 303 being higher than that of the constant voltage and constant current circuit may refer to that the step-down conversion efficiency of the step-down circuit 303 is higher than that of the BUCK circuit in the constant voltage and constant current circuit.

As noted above, in a method for transmitting a wireless charging signal based on a high voltage, the output voltage of the wireless receiving circuit needs to be reduced greatly. When the output voltage of the wireless receiving circuit is directly reduced by a charging management circuit, restricted by a low step-down conversion efficiency of the constant voltage and constant current circuit, a large energy loss occurs in the step-down process, which therefore leads to a high heat generation of the constant voltage and constant current circuit. According to embodiments of the present disclosure, the output voltage of the wireless receiving circuit is not reduced completely based on the constant voltage and constant current circuit. Rather, the step-down circuit 303 with higher step-down conversion efficiency is adopted to share part or all of the function of step-down, so that the constant voltage and constant current circuit may execute the constant voltage/constant current control in a relatively small voltage range, and the heat generated by the device to be charged is reduced.

The form of the step-down circuit 303 is not particularly limited in embodiments of the present disclosure, as long as the step-down conversion efficiency of the step-down circuit 303 is greater than the step-down conversion efficiency of the constant voltage and constant current circuit. Alternatively, as an implementation, the constant voltage and constant current circuit may use an inductance-type step-down circuit 303 for the step-down. The step-down circuit 303 may use a capacitive step-down circuit 303 (such as the charge pump) for the step-down, or the step-down circuit 303 may use a combination of the inductance-type step-down circuit 303 and the capacitive step-down circuit 303 for the step-down.

Take the step-down circuit 303 being the charge pump as an example. The charge pump is mainly composed of switching devices, so that the energy consumption in the step-down process is small, and the step-down conversion efficiency may be improved. A step-down factor (a ratio of the output voltage to the input voltage) of the charge pump is not particularly limited in the embodiments of the present disclosure, and may be selected according to actual needs, for example, one or more of the step-down factors of ½, ⅓, ⅔ and ¼ may be adopted.

Alternatively, in some embodiments, the input voltage of the constant voltage and constant current circuit may be greater than the output voltage of the constant voltage and constant current circuit. In other words, in the process of stepping down the output voltage of the wireless receiving circuit 301 to a charging voltage presently required by the battery 305, the constant voltage and constant current circuit may perform a part of the step-down operation, and the rest of the step-down operation may be shared by the step-down circuit 303 having a higher step-down conversion efficiency. For example, the constant voltage and constant current circuit may perform a small part of the entire step-down operation, and the step-down circuit 303 may perform the remaining major part of the step-down operation, i.e., a voltage difference caused by the step-down of the step-down circuit 303 is greater than that of the constant voltage and constant current circuit. Since the step-down circuit 303 has a relatively higher step-down conversion efficiency, the above-described distribution manner of the step-down operation may better reduce the heat generation of the device to be charged.

Figure 4:
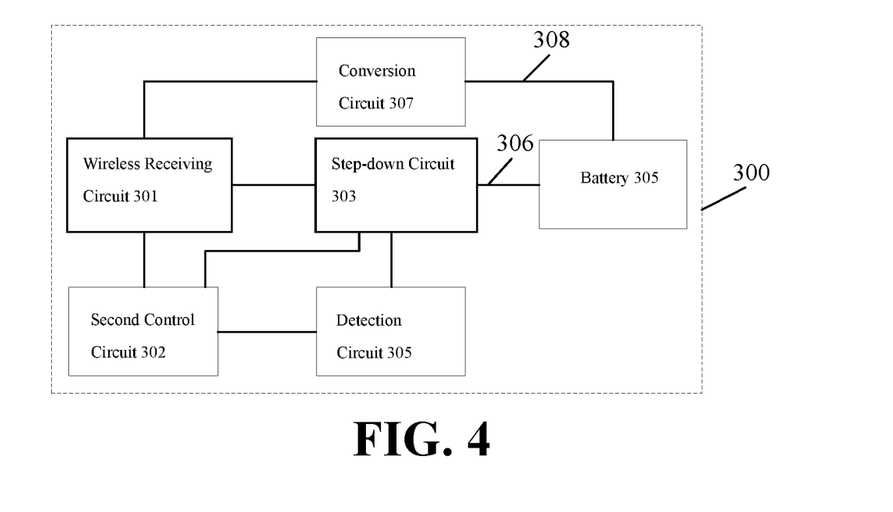
FIG. 4 is a block diagram of a device to be charged according to another embodiment of the present disclosure.

Referring to FIG. 4, in an embodiment of the present disclosure, the device to be charged 300 further includes a second charging channel 308. The second charging channel 308 may be a wire. The conversion circuit 307 may be disposed on the second charging channel 308 for performing voltage control on the direct current output by the wireless receiving circuit 301 to obtain an output voltage and an output current of the second charging channel 308 for charging the battery 305.

In an embodiment, the conversion circuit 307 includes a circuit for voltage stabilization and a circuit for realizing constant current and constant voltage. The circuit for voltage stabilization is coupled to the wireless receiving circuit 301, and the circuit for realizing constant current and constant voltage is coupled to the battery 305. When the second charging channel 308 is used to charge the battery 305, the wireless transmitting circuit 201 may adopt a constant transmitting power. After the wireless receiving circuit 301 receives the electromagnetic signal, the electromagnetic signal is processed by the conversion circuit 307 to a voltage and a current satisfying the charging requirements of the battery 305, and then the voltage and the current are input into the battery 305 to charge the battery 305. It should be understood that in some embodiments, the constant transmitting power does not necessarily remain completely unchanged; instead, it may vary over a range, e.g., the transmitting power may be 7.5±0.5 W.

It should be understood that in some embodiments, the conversion circuit 307 may be the constant current and constant voltage circuit described above, i.e., functions of the conversion circuit 307 may be implemented with the aforementioned constant current and constant voltage circuit. When the second charging channel is adopted, the transmitting power of the wireless transmitting circuit 201 is smaller than the transmitting power of the first charging channel. For instance, when the first charging channel is adopted, the wireless transmitting circuit 201 adopts the transmitting power of 15V/1 A; and when the second charging channel is adopted, the wireless transmitting circuit 201 adopts the transmitting power of 7.5 W/1 A. Therefore, when the second charging channel is adopted, the voltage received by the wireless receiving circuit 301 is less than the voltage received when the first charging channel is adopted. Consequently, the required current and voltage of the battery may be met only through the constant current and the constant voltage of the constant current and constant voltage circuit.

In this embodiment, the second control circuit 302 is further configured to determine an error value according to a comparison between a detected output voltage value of the second charging channel 308 and a set target value (for example, a voltage value actually required by the battery 305), and to send the error value to a first controller in the form of data packet. The output voltage value of the second charging channel 308 may be a voltage value and/or a current value between the conversion circuit 307 and the battery 305.

In an embodiment, when the battery 305 is charged through the second charging channel 308, the wireless charging device and the device to be charged may perform the wireless charging based on the Qi standard. Thus, a data signal containing the error value may be coupled to the coil of the wireless receiving circuit 301 by signal modulation, so that the data signal is transmitted to the coil of the wireless transmitting circuit 201 and then transmitted to the first controller.

In an embodiment of the present disclosure, when the battery 305 is charged through the second charging channel 308, the wireless power transmission control process may include the followings.

The second control circuit 302 determines the error value according to the comparison between the detected output voltage value of the second charging channel 308 and the set target value, and sends the error value to the first controller in the form of data packet. The first controller determines a difference value according to a present current value of the transmitting coil and the information of the error data packet, and sets a new operating frequency according to the difference value, thereby adjusting the transmitting power of the wireless transmitting circuit 201.

In embodiments of the present disclosure, a charging mode corresponding to charging the battery 305 through the first charging channel 306 is referred to as a first charging mode, and a mode corresponding to charging the battery 305 through the second charging channel 308 is referred to as a second charging mode. The wireless charging device and the device to be charged may determine whether to charge the battery 305 in the first charging mode or the second charging mode through communication.

In embodiments of the present disclosure, on the wireless charging device side, when the device to be charged is charged in the first charging mode, the maximum transmitting power of the wireless transmitting circuit 201 may be a first transmitting power value. When the device to be charged is charged in the second charging mode, the maximum transmitting power of the wireless transmitting circuit 201 may be a second transmitting power value. The first transmitting power value is greater than the second transmitting power value, so that the charging speed of charging the device to be charged in the first charging mode is larger than that of charging the device to be charged in the second charging mode.

As described above, in an embodiment, in order to reduce a coil heating problem during the wireless charging process, the wireless transmitting circuit 201 may use a high voltage and low current mode when the first charging mode is adopted. That is, the output voltage of the wireless transmitting circuit 201 in the first charging mode is greater than the output voltage of the wireless transmitting circuit 201 in the second charging mode, such that the first transmitting power value is greater than the second transmitting power value.

On the device to be charged side, the second control circuit 302 switches between the first charging channel 306 and the second charging channel 308 according to the charging mode. When the first charging mode is adopted, the second control circuit 302 controls the step-down circuit 303 on the first charging channel 306 to operate. When the second charging mode is adopted, the second control circuit 302 controls the conversion circuit 307 on the second charging channel 308 to operate.

In embodiments of the present disclosure, the wireless charging device does not blindly charge the device to be charged in the first charging mode or the second charging mode. Rather, the wireless charging device performs bidirectional communication with the device to be charged, and negotiates the charging mode to be adopted with the device to be charged, thereby improving the safety of the charging process.

Figure 5:
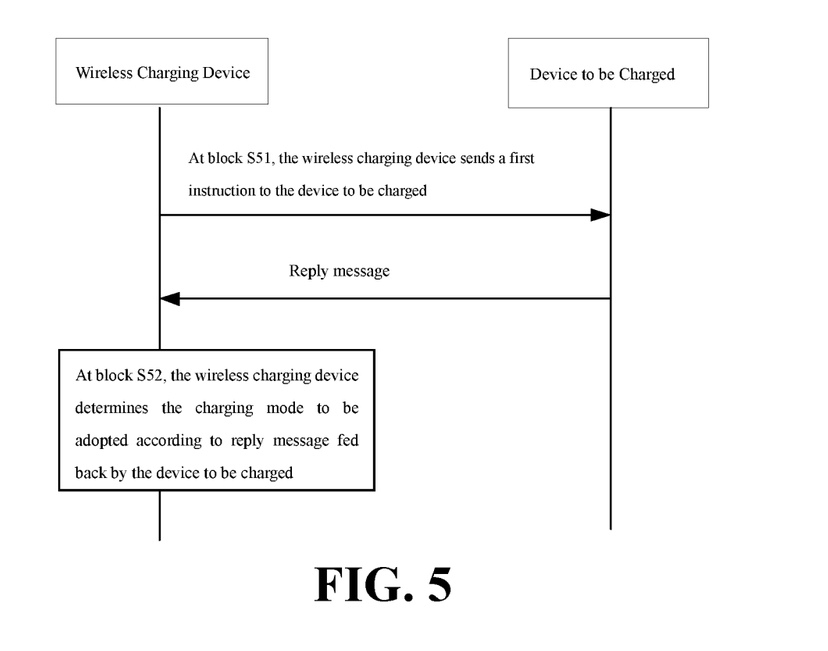
FIG. 5 is a flow chart illustrating communication between a wireless charging device and a device to be charged according to an embodiment of the present disclosure.

FIG. 5 is a flow chart illustrating communication between the wireless charging device and the device to be charged according to an embodiment of the present disclosure.

At block S51, the wireless charging device transmits a first instruction to the device to be charged.

The first instruction is configured to query whether the device to be charged supports the first charging mode. Alternatively, the first instruction is configured to request at least one of the following information of the device to be charged: a type or a model of the device to be charged (e.g., a model set when the device to be charged leaves a factory), an identification code of the device to be charged (e.g., a character string preset on the device to be charged for identifying whether the device to be charged supports the first charging mode), the maximum charging voltage supported by the device to be charged, the maximum charging current supported by the device to be charged, and the like. As described above, the maximum charging voltage and the maximum charging current supported by the device to be charged are related to the circuit parameters of the step-down circuit 303 or the conversion circuit 307 in the device to be charged, and/or are related to the number of cells of the battery 305 in the device to be charged.

At block S52, the wireless charging device determines the charging mode to be adopted according to reply message fed back by the device to be charged.

In an embodiment, when the reply message indicates that the wireless charging device supports the first charging mode, the wireless charging device determines that the charging mode to be adopted is the first charging mode. Otherwise, when the reply message indicates that the wireless charging device does not support the first charging mode, the wireless charging device determines that the charging mode to be adopted is the second charging mode.

In an embodiment, the reply message fed back by the device to be charged may include at least one of the following information: the type or the model of the device to be charged, the identification code of the device to be charged, the maximum charging voltage supported by the device to be charged, the maximum charging current supported by the device to be charged, and the like. The wireless charging device determines the charging mode which may be adopted according to the received reply message. For example, when the type or the model of the device to be charged is a type or a model that supports the first charging mode, it is determined that the first charging mode is adopted to wirelessly charge the device to be charged.

In an embodiment, the wireless charging device may feed back the determined charging mode to the device to be charged. Consequently, the device to be charged may control the first charging channel 306 or the second charging channel 308 to be turned on.

In an embodiment, the communication between the wireless charging device and the device to be charged may be Bluetooth communication, Wi-Fi communication, short-distance wireless communication based on high carrier frequency, optical communication, ultrasonic communication, ultra-wideband communication, mobile communication, or other wireless communication modes.

In an embodiment, a short-distance wireless communication module based on the high carrier frequency includes an IC chip internally packaged with an EHF antenna. Alternatively, the high carrier frequency is 60 GHz.

In an embodiment, an optical communication module includes an infrared communication module, and thus information may be transmitted by infrared rays.

In an embodiment, a mobile communication module may transmit information by utilizing a mobile communication protocol such as a 5G communication protocol, a 4G communication protocol, or a 3G communication protocol.

Compared with the method of performing communication via the coil coupled to the wireless receiving circuit 301 by signal modulation, the above wireless communication modes may improve the reliability of communication and prevent the voltage processing process of the conversion circuit 307 or the step-down circuit 303 from being affected by a voltage ripple brought by communication in a manner of signal coupling.

In embodiments of the present disclosure, apart from communicating with the device to be charged and determining the charging mode between the wireless charging device and the device to be charged, the wireless charging device may further communicate with the power supply device to determine the charging mode between the power supply device and the wireless charging device.

As described above, when the first charging mode is adopted between the wireless charging device and the device to be charged, the transmitting power adopted by the wireless charging device is higher than the transmitting power adopted when the second charging mode is used, that is, when the first charging mode is adopted, the wireless transmitting circuit 201 of the wireless charging device requires a higher voltage. Therefore, the wireless charging device may further communicate with the power supply device to enable the power supply device to provide an appropriate voltage.

In an embodiment, types of the power supply device include a fast-charging-type power supply device and a non-fast-charging-type power supply device. An output voltage that may be provided by the fast-charging-type power supply device is greater than an output voltage that may be provided by the non-fast-charging-type power supply device. For example, an output voltage/output current of the non-fast-charging-type power supply device is 5V/2 A; and an output voltage/output current of the fast-charging-type power supply device is 15V/2 A.

When the power supply device is the fast-charging-type power supply device, the voltage provided to the wireless charging device by the power supply device may support the wireless charging device to adopt the first charging mode. When the power supply device is the non-fast-charging-type power supply device, the voltage provided to the wireless charging device by the power supply device may support the wireless charging device to adopt the second charging mode.

In an embodiment, the wireless charging device communicates with the power supply device, determines the type of the power supply device, and communicates with the device to be charged according to the method described above to determine the charging mode supported by the device to be charged. After that, the wireless charging device may determine the charging mode to be adopted according to the type of the power supply device and/or the charging mode supported by the device to be charged.

In some embodiments, when the power supply device is the non-fast-charging-type power supply device and the device to be charged supports the first charging mode, the wireless charging device may convert the voltage provided by the power supply device through the voltage conversion circuit 203, for adopting the first charging mode.

In some embodiments, when the power supply device is the fast-charging-type power supply device, and the device to be charged supports the first charging mode, but the voltage provided by the power supply device cannot meet the requirement of the wireless transmitting circuit 201 (i.e., the voltage requirement of the wireless transmitting circuit 201 when the first charging mode is adopted), the voltage provided by the power supply device may also be converted by the voltage conversion circuit 203, for adopting the first charging mode.

In some embodiments, when the power supply device is the fast-charging-type power supply device, but the device to be charged only supports the second charging mode (e.g., the device to be charged only includes the second charging channel 308), the voltage conversion circuit 203 may convert (e.g., step down) the voltage provided by the power supply device and then the second charging mode may be adopted.

In some embodiments, when the power supply device is the non-fast-charging-type power supply device and the device to be charged supports the second charging mode, the wireless charging device determines to adopt the second charging mode.

When the wireless charging device adopts the first charging mode to charge the battery 305 in the device to be charged, in order to solve problems of heating and low charging efficiency caused by adopting a low-voltage and high-current wireless charging mode in the related art, in embodiments of the present disclosure, a high-voltage and low-current wireless charging mode is adopted to reduce heating and to improve charging efficiency.

In an embodiment of the present disclosure, the voltage conversion circuit 203 is disposed at the wireless charging device end. The first charging channel 306 (for example, the wire) coupled to the battery 305 is provided at the device to be charged side. The first charging channel 306 is provided with the step-down circuit 303 for stepping down the output voltage of the wireless receiving circuit 301, so that the output voltage and the output current of the first charging channel 306 meet the charging requirements of the battery 305.

In an embodiment, supposing that the wireless charging device 200 charges the single-cell battery 305 in the device to be charged with an output power of 20 W, when the single-cell battery 305 is charged by using the second charging channel 308, the input voltage of the wireless transmitting circuit 201 needs to be 5V, and the input current needs to be 4 A. And the use of the current of 4 A inevitably causes the coil to generate heat, thereby reducing the charging efficiency.

When the single-cell battery 305 is charged by using the first charging channel 306, since the step-down circuit 303 is provided in the first charging channel 306, the input voltage of the wireless transmitting circuit 201 may be increased without changing the transmitting power (the aforementioned 20 W) of the wireless transmitting circuit 201, and thus, the input current of the wireless transmitting circuit 201 may be reduced.

In an embodiment of the present disclosure, the step-down circuit 303 may adopt the half-voltage circuit, that is, a ratio of the input voltage to the output voltage of the step-down circuit 303 is fixed at 2:1, so as to further reduce the heat generation of the step-down circuit 303.

When the step-down circuit 303 adopts the half-voltage circuit, for example, the input voltage and the input current of the wireless transmitting circuit 201 may be 10V and 2 A, respectively, and thus, the output voltage of the wireless receiving circuit 301 is 10V (it is understood that the actual value will be close to 10V in consideration of power loss). With the step-down of the step-down circuit 303, the output voltage of the first charging channel 306 is 5V, thus realizing charging the battery 305. It should be understood that this embodiment is described with the required voltage of the battery 305 being 5V, and that the second control circuit 302 feeds back the voltage and/or the current detected by the detection circuit 304 in real time to the first control circuit 202 when the battery 305 is actually charged. The first control circuit 202 adjusts the output power of the wireless transmitting circuit 201 according to the fed back voltage and/or current.

In embodiments of the present disclosure, the wireless charging device 200 may adjust the output power of the wireless transmitting circuit 201 in various ways. Specifically, an adjustment method may include any one or a combination of several of the following three methods.

(1) When the voltage input to the wireless transmitting circuit 201 is fixed, the output power of the wireless transmitting circuit 201 is adjusted by adjusting parameters such as a tuning frequency of the resonant circuit and/or the duty ratio of the switch tube in the inverter circuit.

(2) The output voltage of the voltage conversion circuit 203 (that is, the voltage input to the wireless transmitting circuit 201) is adjusted, such that the adjustment of the output power of the wireless transmitting circuit 201 is realized.

(3) In a case where the voltage conversion circuit 203 shown in FIG. 1 is removed, the output power of the wireless transmitting circuit 201 is adjusted by adjusting the output voltage of the power supply device (i.e., the voltage input to the wireless charging device).

The communication manner between the first control circuit 202 and the power supply device is not particularly limited in embodiments of the present disclosure. As an example, the first control circuit 202 may be coupled to the power supply device through a communication interface other than the charging interface, and may communicate with the power supply device through the communication interface. As another example, the first control circuit 202 may communicate with the power supply device in a wireless manner. For example, the first control circuit 202 may perform near field communication (NFC) with the power supply device. As yet another example, the first control circuit 202 may communicate with the power supply device through the charging interface without providing an additional communication interface or other wireless communication module, which may simplify the implementation of the wireless charging device. For example, the charging interface is a USB interface, and the first control circuit 202 may communicate with the power supply device based on data lines (e.g., D+ and/or D− line) in the USB interface. For another example, the charging interface may be a USB interface (e.g., a USB TYPE-C interface) supporting a power delivery (PD) communication protocol, and the first control circuit 202 and the power supply device may communicate with each other based on the PD communication protocol.

In embodiments of the present disclosure, the manner of adjusting the output power of the power supply device is not particularly limited. For example, a voltage feedback loop and a current feedback loop may be provided inside the power supply device, so that the output voltage and/or the output current of the power supply device may be adjusted according to actual needs.

In an embodiment, the wireless charging device 200 may be set into various shapes, for example, a circle, a square and the like. When the device to be charged is placed on a charging surface (a surface on which the transmission coil is arranged) of the wireless charging device 200, the wireless charging device 200 starts wireless charging according to a wireless charging flow shown in FIG. 6.

Figure 6:
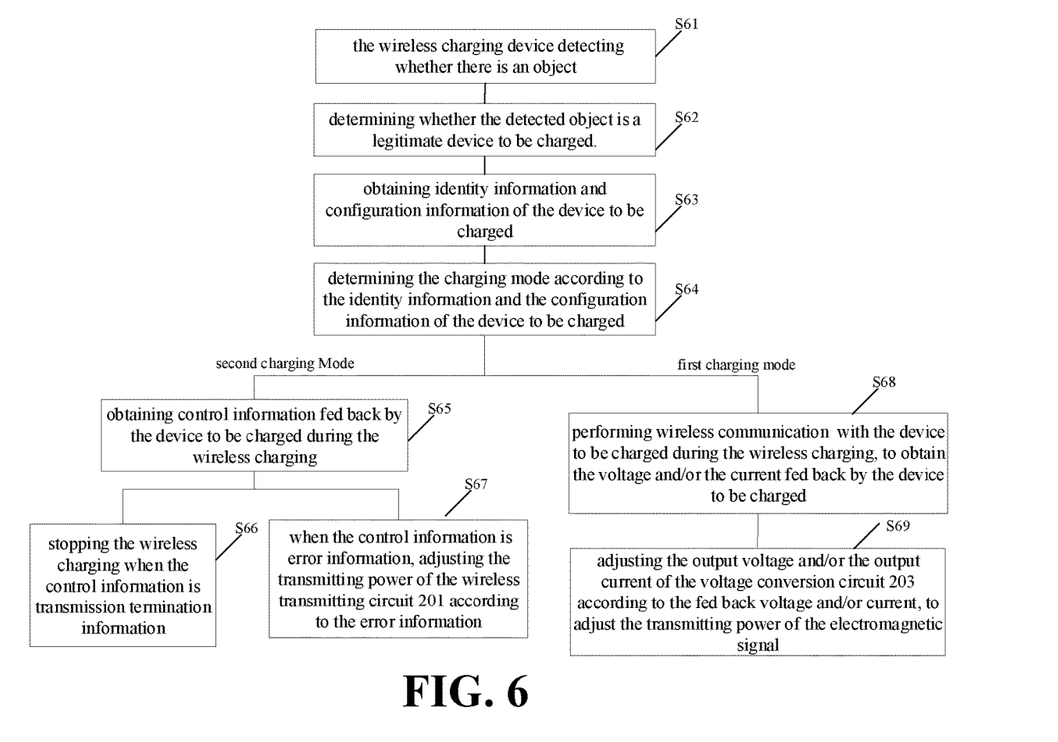
FIG. 6 is a flow chart of wireless charging according to an embodiment of the present disclosure.

FIG. 6 is a flow chart of wireless charging according to an embodiment of the present disclosure.

At block S61, the wireless charging device detects whether there is an object.

For example, the wireless charging device sends energy at preset time intervals to detect whether an object is placed on the surface.

At block S62, it is determined whether the detected object is a legitimate device to be charged.

At block S63, identity information and configuration information of the device to be charged are acquired.

For example, the identity information may be the identification code on the device to be charged, and the configuration information may be the type or the model of the device to be charged.

At block S64, the charging mode is determined according to the identity information and the configuration information of the device to be charged.

For example, the charging mode may be determined according to the type of the power supply device and/or the charging mode supported by the device to be charged, as mentioned above.

In embodiments of the present disclosure, when it is determined that the second charging mode is adopted, the wireless charging process from block S65 to block S67 is performed; and when it is determined that the first charging mode is adopted, the wireless charging process from block S68 to block S69 is performed.

At block S65, in the wireless charging process, control information fed back by the device to be charged is obtained.

In an embodiment, as aforementioned, a data packet signal including the control information may be coupled to the coil of the wireless receiving circuit 301 by the second control circuit 302 in the device to be charged, transmitted to the coil of the wireless transmitting circuit 201, and then transmitted to the first controller in the wireless charging device. The control information may include the aforementioned error value.

At block S66, when the control information is transmission termination information, the wireless charging is stopped.

At block S67, when the control information is error information, the transmitting power of the wireless transmitting circuit 201 is adjusted according to the error information.

For example, the adjustment of the transmitting power may be performed by the above-described method (1) or (3).

At block S68, in the process of wireless charging, wireless communication is performed with the device to be charged, and the voltage and/or the current fed back by the device to be charged (e.g., the voltage and/or the current entering the battery) is acquired.

At block S69, the output voltage and/or the output current of the voltage conversion circuit 203 is adjusted according to the fed back voltage and/or current to adjust the transmitting power of the electromagnetic signal.

For example, the transmitting power may be adjusted according to any one or more of the above-described methods (1), (2) and (3).

It should be understood that, regardless of whether the first charging mode or the second charging mode is adopted, when a charging termination condition is satisfied, the wireless charging is stopped. For example, when it is detected that the device to be charged is away from the charging surface, the charging termination condition is satisfied. Or, when an abnormal condition occurs in the charging process (for example, overvoltage, overcurrent, overtemperature or the like occurs in the charging process), the charging termination condition is satisfied.

In an embodiment of the present disclosure, when the first charging mode is adopted, the output voltage of the wireless receiving circuit 301 of the device to be charged is determined by the output voltage of the voltage conversion circuit 203. According to an embodiment of the present disclosure, the voltage difference between the input voltage and the output voltage of the step-down circuit 303 is reduced, so that the working efficiency of the step-down circuit 303 is improved, and a temperature rise is reduced. In an embodiment, since the input voltage of the step-down circuit 303 is determined by the input voltage of the wireless receiving circuit 301, the voltage difference of the step-down circuit 303 may be reduced by reducing the input voltage of the wireless receiving circuit 301.

It should be understood that in embodiments of the present disclosure, the wireless charging device and/or the device to be charged may perform wireless charging only in the first charging mode, or may perform wireless charging in both the first charging mode and the second charging mode. Embodiments of the present disclosure are not limited thereto.

In an embodiment, in order to ensure that the charging current of the battery 305 is constant, when the input voltage of the wireless receiving circuit 301 is reduced, the input current of the wireless receiving circuit 301 needs to be increased. An increase in the input current leads to an increase in the current on the receiving coil, which increases the temperature rise of the coil. Therefore, the first control circuit 202 in the wireless charging device according to an embodiment of the present disclosure further adjusts the output voltage of the voltage conversion circuit 203 according to the output current of the step-down circuit 303 fed back by the device to be charged and a preset current threshold.

In an embodiment, the current threshold includes a first current threshold and a second current threshold, wherein the first current threshold is greater than the second current threshold. The first control circuit 202 is configured to control the output voltage of the voltage conversion circuit 203 to increase when the output current of the step-down circuit 303 is greater than the first current threshold, and to control the output voltage of the voltage conversion circuit 203 to reduce when the output current of the step-down circuit 303 is less than the second current threshold.

It should be understood that, in the case where the transmitting power is constant, when the output current of the step-down circuit 303 is greater than the first current threshold, even if the voltage difference of the step-down circuit 303 satisfies the preset condition, the coil may generate heat due to an excessive current of the receiving coil. Therefore, the output voltage of the voltage conversion circuit 203 is controlled to be increased, so that the current is reduced, and the heat generation of the coil is advantageously reduced. When the output current of the step-down circuit 303 is less than the second current threshold, the voltage difference of the step-down circuit 303 will increase, which causes the step-down circuit 303 to generate heat. Thus, the output voltage of the voltage conversion circuit 203 is controlled to be reduced to lower the voltage difference of the step-down circuit 303, thereby reducing the heat generation of the step-down circuit 303.

In an embodiment, based on data in a debugging stage or test data obtained in tests, etc., a temperature-rise model database may be established, and the maximum current threshold allowed on a charging coil (i.e. the first current threshold) and the second current threshold may be determined.

In an embodiment of the present disclosure, the first control circuit 202 of the wireless charging device further adjusts the output voltage of the voltage conversion circuit 203 according to the output voltage of the step-down circuit 303 fed back by the device to be charged and a preset corresponding relationship between the voltage difference and the charging efficiency.

In an embodiment, through debugging and testing according to operating characteristics of the step-down circuit 303, the voltage difference of the step-down circuit 303 in its optimal efficiency may be obtained and the corresponding relationship between the voltage difference and the charging efficiency may be determined. The charging efficiency may be reflected by the temperature rise. For example, the charging efficiency is inversely proportional to the temperature rise: the higher the charging efficiency is, the lower the temperature rise is.

In an embodiment, the voltage difference may also be a voltage difference between the input voltage of the battery 305 and the output voltage of the voltage conversion circuit 203. It should be understood that in some embodiments, the voltage difference of the step-down circuit 303 may also be obtained according to the voltage of the battery and any of the following voltages: the output voltage of the wireless transmitting circuit, the output voltage of the wireless receiving circuit, the input voltage of the step-down circuit 303, and the output voltage of the voltage conversion circuit.

Therefore, the output voltage of the voltage conversion circuit 203 may be adjusted according to the voltage difference of the step-down circuit 303 and the aforementioned corresponding relationship, for achieving the optimal charging efficiency. Alternatively, the input voltage of the battery 305 is determined according to the fed back output voltage of the step-down circuit; and the output voltage of the voltage conversion circuit 203 is adjusted according to the determined voltage difference between the input voltage of the battery 305 and the output voltage of the voltage conversion circuit 203 and the aforementioned corresponding relationship, for achieving the optimal charging efficiency.

In an embodiment of the present disclosure, the two voltage adjustment methods for the voltage conversion circuit 203 may be combined. That is, the output voltage of the voltage conversion circuit 203 is adjusted to the first voltage according to the output voltage of the step-down circuit 303 fed back by the device to be charged and the preset corresponding relationship between the voltage difference and the charging efficiency; and after the output voltage of the voltage conversion circuit 203 is adjusted to the first voltage, the output voltage of the voltage conversion circuit 203 is adjusted to the second voltage according to the output current of the step-down circuit 303 fed back by the device to be charged and the preset current threshold. Consequently, it is possible to roughly or finely adjust the output voltage of the voltage conversion circuit 203, thereby ensuring the accuracy of adjustment.

Figure 7:
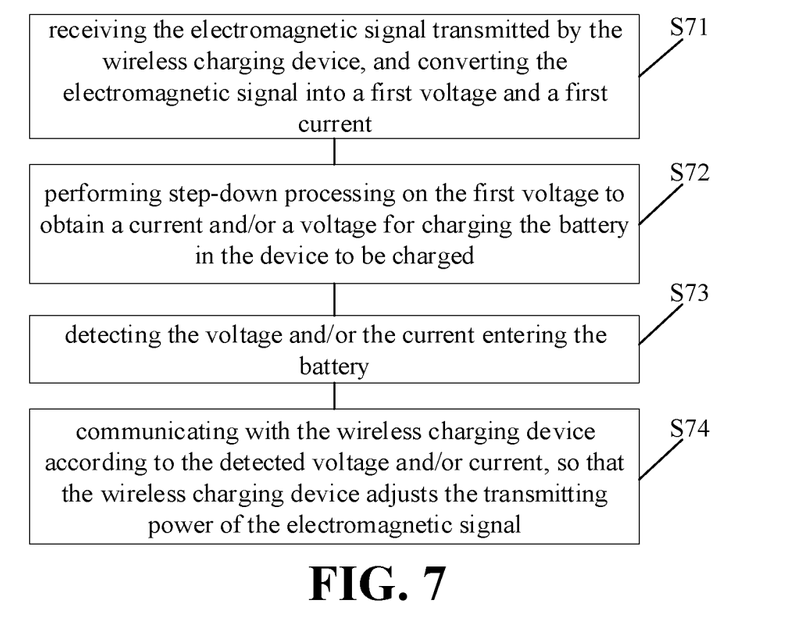
FIG. 7 is a flow chart of a wireless charging method according to an embodiment of the present disclosure.

FIG. 7 is a flow chart of a wireless charging method according to an embodiment of the present disclosure. The wireless charging method is applied to the device to be charged.

At block S71, the electromagnetic signal transmitted by the wireless charging device is received, and the electromagnetic signal is converted into a first voltage and a first current.

At block S72, step-down processing is performed on the first voltage to obtain a voltage and/or a current for charging a battery in the device to be charged.

At block S73, the voltage and/or the current entering the battery is detected.

At block S74, communication is performed with the wireless charging device according to the detected voltage and/or current, so that the wireless charging device adjusts the transmitting power of the electromagnetic signal.

In an embodiment, the communication with the wireless charging device is performed according to the voltage and/or the current detected entering the battery as follows:

Adjustment information is sent to the wireless charging device according to the detected voltage and/or current, wherein the adjustment information is configured to instruct the wireless charging device to perform a voltage and/or current adjustment on the electric energy received from the power supply device so as to adjust the transmitting power of the electromagnetic signal.

In an embodiment, the method further includes: receiving, by the conversion circuit 307, the output voltage and the output current of the wireless receiving circuit 301, and performing the constant voltage and/or constant current control on the output voltage and/or the output current of the wireless receiving circuit 301, for charging the battery 305; and communicating with the wireless charging device to determine whether to control the step-down circuit 303 or the conversion circuit 307 to operate.

Figure 8:
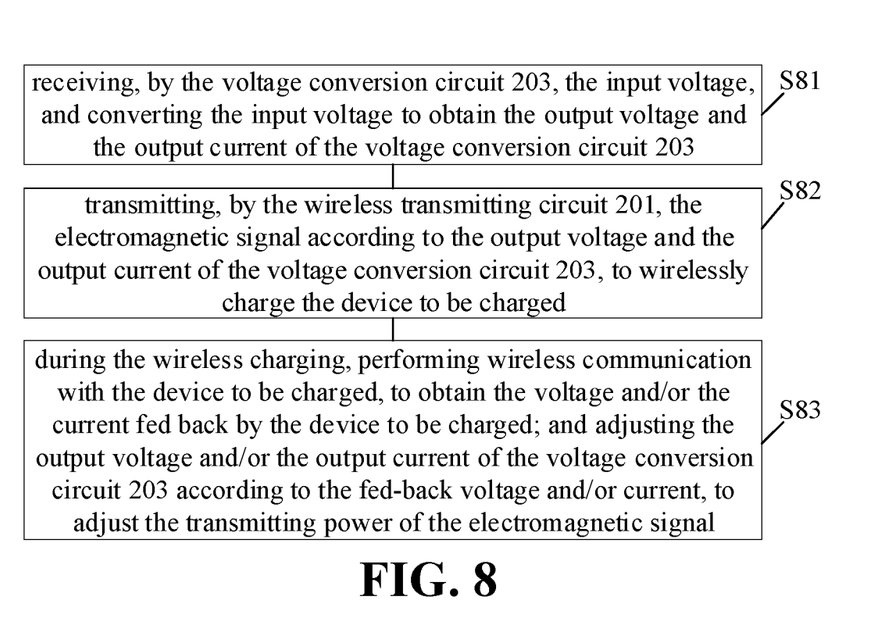
FIG. 8 is a flow chart of a wireless charging method according to another embodiment of the present disclosure.

FIG. 8 is a flow chart of a wireless charging method according to another embodiment of the present disclosure. The wireless charging method is applied to the wireless charging device.

At block S81, the input voltage is received by the voltage conversion circuit 203, and the input voltage is converted to obtain the output voltage and the output current of the voltage conversion circuit 203.

At block S82, the electromagnetic signal is transmitted by the wireless transmitting circuit 201 according to the output voltage and the output current of the voltage conversion circuit 203, to wirelessly charge the device to be charged.

At block S83, during the wireless charging, the wireless communication is performed with the device to be charged, and the voltage and/or the current fed back by the device to be charged is obtained; and the output voltage and/or the output current of the voltage conversion circuit 203 is adjusted according to the fed-back voltage and/or current to adjust the transmitting power of the electromagnetic signal.

It should be understood that details of implementation of each block in the above method are described in the foregoing embodiments, and are not described in detail herein.

In embodiments of the present disclosure, the current output by the step-down circuit 303 is a constant direct current, a pulsating direct current, or an alternating current.

In embodiments of the present disclosure, the process of charging the battery 305 with either the first charging channel 306 or the second charging channel 308 may include a trickle charging stage, a constant-current charging stage and a constant-voltage charging stage. It should be noted that the constant-current charging stage mentioned in embodiments of the present disclosure does not necessarily keep the charging current completely constant. For example, the constant-current charging stage may refer to that a peak value or an average value of the charging current may be kept constant for a period of time. In practice, the constant-current charging stage may adopt a multi-stage constant current mode for charging.

The multi-stage constant current charging may include N charging stages, where N is an integer no less than 2. The first charging stage of the multi-stage constant current charging starts with predetermined charging current. N constant charging stages in the multi-stage constant current charging are performed in sequence from the first charging stage to the $(N-1)^{th}$ charging stage. When the charging proceeds to a next charging stage from one charging stage, the charging current value reduces. When the voltage of the battery 305 reaches a charging termination voltage threshold, the charging proceeds to a next charging stage from one charging stage.

In embodiments of the present disclosure, a communication manner and a communication sequence between the wireless charging device and the device to be charged are not particularly limited.

Alternatively, in some embodiments, the wireless communication between the wireless charging device and the device to be charged (or between the second control circuit 302 and the first control circuit 202) may be unidirectional wireless communication.

For example, during the wireless charging process of the battery 305, it may be specified that the device to be charged is an initiator of the communication and the wireless charging device is a receiver of the communication. For example, during the constant-current charging stage of the battery 305, the device to be charged may detect the charging current of the battery 305 (i.e., the output current of the wireless receiving circuit 301) in real time through the detection circuit 304. When the charging current of the battery 305 does not match the charging current presently required by the battery 305, the device to be charged sends adjustment information to the wireless charging device to instruct the wireless charging device to adjust the transmitting power of the wireless transmitting circuit 201.

Alternatively, in some embodiments, the wireless communication between the wireless charging device and the device to be charged (or between the second control circuit 302 and the first control circuit 202) may be bidirectional wireless communication. Bidirectional wireless communication generally requires that the receiver sends a response message to the initiator after receiving a communication request initiated by the initiator. The bidirectional communication mechanism may make the communication process safer.

The master-slave relation between the wireless charging device (the first control circuit 202 in the wireless charging device) and the device to be charged (the first control circuit 202 in the device to be charged) is not limited in embodiments of the present disclosure. In other words, either the wireless charging device or the device to be charged may initiate a bidirectional communication session as a master device side, and accordingly, the other one, as a slave device side, may make a first response or a first reply to the communication initiated by the master device side. As a feasible implementation, during the communication, the identifications of the master device and the slave device can be determined by comparing link conditions between the wireless charging device and the device to be charged. For example, assuming that a wireless link through which the wireless charging device transmits information to the device to be charged is an uplink and a wireless link through which the device to be charged transmits information to the wireless charging device is a downlink, the wireless charging device may be set as the master device for communication when the link quality of the uplink is better, and the device to be charged may be set as the slave device for communication when the link quality of the downlink is better.

The specific implementation manner of the bidirectional communication between the wireless charging device and the device to be charged is not particularly limited in embodiments of the present disclosure. In other words, any one of the wireless charging device and the device to be charged initiates a communication session as a master device, and correspondingly, the other one of the wireless charging device and the device to be charged makes as a slave device, the first response or the first reply to the communication session initiated by the master device. The master device may make a second response to the first response or the first reply from the slave device, that is, the master device and the slave device completes one communication negotiation process.

In an implementation, the master device may make the second response to the first response or the first reply made by the slave device to the communication session in a manner that, the master device may receive the first response or the first reply which is made by the slave device to the communication session, and may make the targeted second response according to the first response or the first reply received from the slave device.

In another implementation, the master device may make a further second response to the first response or the first reply made by the slave device to the communication session in a manner that, even if the master device does not receive the first response or the first reply made by the slave device to the communication session within the preset time, the master device still makes the targeted second response to the first response or the first reply of the slave device.

Optionally, in some embodiments, when the device to be charged is configured as the mater device for initiating the communication session, after the wireless charging device configured as the slave device makes the first response or the first reply to the communication session initiated by the master device, it is unnecessary for the device to be charged to make the targeted second response to the first response or the first reply of the wireless charging device, i.e., one communication negotiation process is regarded as completed between the wireless charging device and device to be charged.

The wireless communication manner between the first control circuit 202 in the wireless charging device and the second control circuit 302 in the device to be charged is not particularly limited in embodiments of the present disclosure. For example, the first control circuit 202 and the second control circuit 302 may perform wireless communication based on Bluetooth, wireless fidelity (Wi-Fi), or a backscatter modulation mode (or a power-load modulation mode).

As noted above, during the wireless charging, the second control circuit 302 may perform wireless communication with the first control circuit 202 based on the voltage and/or the current on the first charging channel 306 detected by the detection circuit 304, such that the first control circuit 202 adjusts the transmitting power of the wireless transmitting circuit 201. However, the communication content between the second control circuit 302 and the first control circuit 202 is not particularly limited in embodiments of the present disclosure.

As an example, the second control circuit 302 may send the output voltage and/or the output current of the first charging channel 306 detected by the detection circuit 304 to the first control circuit 202. Further, the second control circuit 302 may also send status information of the battery 305 to the first control circuit 202, wherein the status information of the battery 305 includes a present electric quantity and/or a present voltage of the battery 305 in the device to be charged. The first control circuit 202 may first determine a charging stage where the battery 305 is presently in according to the status information of the battery 305, and further determine a target charging voltage and/or a target charging current that match a charging voltage and/or a charging current presently required by the battery 305. After that, the first control circuit 202 may compare the output voltage and/or the output current of the first charging channel 306 sent from the second control circuit 302 with the above-mentioned target charging voltage and/or target charging current to determine whether the output voltage and/or the output current of the first charging channel 306 matches the charging voltage and/or the charging current presently required by the battery 305. When the output voltage and/or the output current of the first charging channel 306 does not match the charging voltage and/or the charging current presently required by the battery 305, the first control circuit 202 adjusts the transmitting power of the wireless transmitting circuit 201 until the output voltage and/or the output current of the first charging channel 306 matches the charging voltage and/or the charging current presently required by the battery 305.

As another example, the second control circuit 302 may send the adjustment information to the first control circuit 202 to instruct the first control circuit 202 to adjust the transmitting power of the wireless transmitting circuit 201. For example, the second control circuit 302 may instruct the first control circuit 202 to increase the transmitting power of the wireless transmitting circuit 201. As another example, the second control circuit 302 may instruct the first control circuit 202 to reduce the transmitting power of the wireless transmitting circuit 201. More specifically, the wireless charging device may set several levels of the transmitting power for the wireless transmitting circuit 201, and the first control circuit 202 adjusts the transmitting power of the wireless transmitting circuit 201 by one level each time the adjustment information is received, until the output voltage and/or the output current of the first charging channel 306 matches the charging voltage and/or the charging current presently required by the battery 305.

In addition to the communication content described above, much other communication information may be exchanged between the first control circuit 202 and the second control circuit 302. In some embodiments, information for safety protection, abnormality detection or fault handling may be exchanged between the first control circuit 202 and the second control circuit 302, such as temperature information of the battery 305, information indicating an entrance of an overvoltage protection or an overcurrent protection, and power transmission efficiency information (which may be used to indicate power transmission efficiency between the wireless transmitting circuit 201 and the wireless receiving circuit 301).

For example, when the temperature of the battery 305 is too high, the first control circuit 202 and/or the second control circuit 302 may control a charging loop to enter a protection state by, for example, controlling the charging loop to stop wireless charging. For another example, after the first control circuit 202 receives indication information of the overvoltage protection or the overcurrent protection sent by the second control circuit 302, the first control circuit 202 may reduce the transmitting power or may control the wireless transmitting circuit 201 to stop working. For another example, after the first control circuit 202 receives the power transmission efficiency information sent by the second control circuit 302, when the power transmission efficiency is lower than a preset threshold, the first control circuit 202 may control the wireless transmitting circuit 201 to stop working, and a user may be notified of this event from, for example, a display screen displaying that or an indicator light indicating that the power transmission efficiency is too low, so that the user may adjust the wireless charging environment.

In some embodiments, other information that may be used to adjust the transmitting power of the wireless transmitting circuit 201 may be interacted between the first control circuit 202 and the second control circuit 302, such as the temperature information of the battery 305, information indicating the peak value or the average value of the voltage and/or the current on the first charging channel 306, the power transmission efficiency information (which may be used to indicate the power transmission efficiency between the wireless transmitting circuit 201 and the wireless receiving circuit 301), and so on.

For example, the second control circuit 302 may send the power transmission efficiency information to the first control circuit 202, and the first control circuit 202 is further configured to determine an adjustment magnitude of the transmitting power of the wireless transmitting circuit 201 according to the power transmission efficiency information. Specifically, when the power transmission efficiency information indicates that the power transmission efficiency between the wireless transmitting circuit 201 and the wireless receiving circuit 301 is low, the first control circuit 202 may increase the adjustment magnitude of the transmitting power of the wireless transmitting circuit 201, so that the transmitting power of the wireless transmitting circuit 201 quickly reaches a target power.

For another example, when the wireless receiving circuit 301 outputs a voltage and/or a current with a pulsating waveform, the second control circuit 302 may send information indicating the peak value or the average value of the output voltage and/or the output current of the first charging channel 306 to the first control circuit 202. The first control circuit 202 may determine whether the peak value or the average value of the output voltage and/or the output current of the first charging channel 306 matches the charging voltage and/or the charging current presently required by the battery 305, and if not, may adjust the transmitting power of the wireless transmitting circuit 201.

As another example, the second control circuit 302 may send the temperature information of the battery 305 to the first control circuit 202. When the temperature of the battery 305 is too high, the first control circuit 202 may reduce the transmitting power of the wireless transmitting circuit 201 to reduce the output current of the wireless receiving circuit 301, thereby lowering the temperature of the battery 305.

Although the preferred embodiments of the present disclosure have been described in detail with reference to the accompanying drawings, the present disclosure is not limited to the details of the embodiments, and various simple modifications can be made to the technical solutions of the present disclosure within the scope of the technical concept of the present disclosure, in which the simple modifications are within the scope of the present disclosure.

It should be further noted that the specific technical features described in the above detailed embodiments may be combined in any suitable manner without contradiction. In order to avoid unnecessary repetition, various possible combinations will not be described separately in the present disclosure.

In addition, any combination of various embodiments of the present disclosure may be made as long as the combination does not deviate from the concept of the present disclosure, and should be equally regarded as the disclosure of the present disclosure.

What is claimed is:

1. A device to be charged, comprising:
    a battery;
    a wireless receiving circuit, configured to receive an electromagnetic signal transmitted by a wireless charging device and to convert the electromagnetic signal into an output voltage and an output current of the wireless receiving circuit;
    a step-down circuit, coupled between the battery and the wireless receiving circuit, and configured to receive the output voltage of the wireless receiving circuit and perform step-down processing on the output voltage of the wireless receiving circuit;
    a detection circuit, configured to detect at least one of a voltage of the battery or a current entering the battery;
    a control circuit, configured to communicate with the wireless charging device based on the at least one of the voltage or the current detected by the detection circuit, to enable the wireless charging device to adjust a transmitting power of the electromagnetic signal; and
    a constant voltage and constant current circuit, wherein the constant voltage and constant current circuit is coupled between the wireless receiving circuit and the step-down circuit, and is configured to perform at least one of constant voltage control or constant current control on an output of the wireless receiving circuit or the constant voltage and constant current circuit is coupled between the step-down circuit and the battery, and is configured to perform the at least one of constant voltage control or constant current control on an output of the step-down circuit;

wherein the step-down circuit has a higher step-down conversion efficiency than the constant voltage and constant current circuit, and a voltage difference caused by the step-down of the step-down circuit is greater than a voltage difference caused by the constant voltage and constant current circuit.

2. The device to be charged according to claim 1, wherein the step-down circuit is a charge pump, and a ratio of an output voltage to an input voltage of the charge pump is any one of ½, ⅓, ⅔ and ¼.

3. The device to be charged according to claim 1, further comprising:
 a constant voltage and constant current control circuit, configured to control at least one of the constant voltage control or constant current control of the constant voltage and constant current circuit according to the at least one of the voltage or the current detected by the detection circuit.

4. The device to be charged according to claim 3, wherein the constant voltage and constant current circuit is coupled between the wireless receiving circuit and the step-down circuit, and the step-down circuit is further configured to receive an output voltage of the constant voltage and constant current circuit, and to perform step-down processing on the output voltage of the constant voltage and constant current circuit.

5. The device to be charged according to claim 3, wherein the constant voltage and constant current circuit comprises a Buck circuit or a low dropout linear regulator.

6. The device to be charged according to claim 1, wherein the battery comprises N cells coupled in series, N being a positive integer greater than 1.

7. The device to be charged according to claim 1, wherein the step-down circuit is a Buck circuit.

8. The device to be charged according to claim 1, wherein the control circuit is configured to send adjustment information to the wireless charging device according to the at least one of the voltage or the current detected by the detection circuit, the adjustment information is configured to instruct the wireless charging device to adjust the transmitting power of the electromagnetic signal.

9. The device to be charged according to claim 1, further comprising:
 a conversion circuit, coupled between the wireless receiving circuit and the battery, and configured to receive the output voltage and the output current of the wireless receiving circuit, and to perform at least one of constant voltage control or constant current control on at least one of the output voltage or the output current of the wireless receiving circuit;
 wherein the control circuit is further configured to control a switching between the step-down circuit and the conversion circuit.

10. The device to be charged according to claim 9, wherein the control circuit is further configured to communicate with the wireless charging device to determine whether to control the step-down circuit or the conversion circuit to operate.

11. The device to be charged according to claim 9, wherein the control circuit is further configured to control the switching between the step-down circuit and the conversion circuit according to a temperature of the battery.

12. The device to be charged according to claim 1, wherein a current output by the step-down circuit is a constant direct current, a pulsating direct current or an alternating current.

13. A wireless charging method, applied to a device to be charged, comprising:
 receiving an electromagnetic signal transmitted by a wireless charging device, and converting the electromagnetic signal into a first voltage and a first current;
 performing a step-down processing on the first voltage to obtain at least one of a voltage or a current for charging a battery of the device to be charged;
 detecting at least one of the voltage or the current entering the battery; and
 communicating with the wireless charging device according to the detected at least one of the voltage or the current, to enable the wireless charging device to adjust a transmitting power of the electromagnetic signal;
 the method further comprising:
 performing, by a constant voltage and constant current circuit, at least one of constant voltage control or constant current control on an output of the wireless receiving circuit before outputting the output of the wireless receiving circuit to the step-down circuit or charging the battery after performing, by the constant voltage and constant current circuit, the at least one of constant voltage control or constant current control on an output of the step-down circuit;
 wherein the step-down circuit has a higher step-down conversion efficiency than the constant voltage and constant current circuit, and a voltage difference caused by the step-down of the step-down circuit is greater than a voltage difference caused by the constant voltage and constant current circuit.

14. The method according to claim 13, wherein a ratio of the voltage entering the battery to the first voltage is any one of ½, ⅓, ⅔ and ¼.

15. The method according to claim 13, further comprising:
 performing at least one of constant voltage control or constant current control on the first voltage before performing the step-down processing.

16. The method according to claim 13, further comprising:
 performing at least one of constant voltage control or constant current control on at least one of the voltage or the current for charging the battery.

17. A wireless charging system, comprising a wireless charging device and a device to be charged;
 wherein the device to be charged comprises:
 a battery;
 a wireless receiving circuit, configured to receive an electromagnetic signal transmitted by the wireless charging device and to convert the electromagnetic signal into an output voltage and an output current of the wireless receiving circuit;
 a step-down circuit, coupled between the battery and the wireless receiving circuit, and configured to receive the output voltage of the wireless receiving circuit and to performing step-down processing on the output voltage of the wireless receiving circuit for charging the battery;
 a detection circuit, configured to detect at least one of a voltage or a current outputted by the step-down circuit for charging the battery; and
 a second control circuit, configured to communicate with the wireless charging device according to the at least one of the voltage or the current detected by the detection circuit; and the wireless charging device comprises:

a voltage conversion circuit, configured to receive an input voltage and to convert the input voltage to obtain an output voltage and an output current of the voltage conversion circuit;

a wireless transmitting circuit, configured to transmit the electromagnetic signal according to the output voltage and the output current of the voltage conversion circuit, for performing wireless charging on the device to be charged;

a first control circuit, configured to perform wireless communication with the device to be charged during the wireless charging, so as to obtain at least one of the voltage or the current outputted by the step-down circuit fed back by the device to be charged; and to adjust at least one of the output voltage or the output current of the voltage conversion circuit according to at least one of the voltage or the current outputted by the step-down circuit, so as to adjust a transmitting of the electromagnetic signal; and a constant voltage and constant current circuit, wherein the constant voltage and constant current circuit is coupled between the wireless receiving circuit and the step-down circuit, and is configured to perform at least one of constant voltage control or constant current control on an output of the wireless receiving circuit before outputting the output of the wireless receiving circuit to the step-down circuit or the constant voltage and constant current circuit is coupled between the step-down circuit and the battery, and is configured to charge the battery after performing the at least one of constant voltage control or constant current control on an output of the step-down circuit;

wherein the step-down circuit has a higher step-down conversion efficiency than the constant voltage and constant current circuit, and a voltage difference caused by the step-down of the step-down circuit is greater than a voltage difference caused by the constant voltage and constant current circuit.

18. The wireless charging system according to claim 17, wherein the step-down circuit is a charge pump, and a ratio of an output voltage to an input voltage of the charge pump is any one of ½, ⅓, ⅔ and ¼.

* * * * *